March 12, 1968 M. H. SCHMIDT 3,372,714
METHOD OF CONTROLLING THE FLOW OF MOLTEN
SLAG FROM A BLAST FURNACE
Filed Feb. 25, 1966

INVENTOR
Merle H. Schmidt

United States Patent Office 3,372,714
Patented Mar. 12, 1968

3,372,714
METHOD OF CONTROLLING THE FLOW OF MOLTEN SLAG FROM A BLAST FURNACE
Merle H. Schmidt, Johnstown, Pa., assignor to Bethlehem Steel Corporation, a corporation of Delaware
Filed Feb. 25, 1966, Ser. No. 530,015
1 Claim. (Cl. 141—1)

This invention in general relates to the casting of molten slag and in particular to a method for controlling the continuous flow of molten slag from a blast furnace to slag pots.

As is well known in the art, iron ore is reduced to molten iron in a blast furnace. In the process a large volume of slag is formed which, due to its lower specific gravity, floats atop the accumulated pool of molten iron in the hearth of the furnace. From time to time it is necessary to tap the furnace to remove the molten iron and/or the slag layer therefrom. The slag is directed to appropriate slag receiving vessels called slag pots by a system of troughs or runners, designated as one main runner and several branch runners, formed in the casting house floor. The slag receiving vessels are mounted on railroad cars positioned on depressed tracks parallel to the edge of the casting house floor. The slag is discharged into slag receiving vessels which are constructed in the shape of inverted cones, that is, the largest diameter is uppermost. In order for each of the slag receiving vessels to receive the slag from the furnace, it is necessary to space several of the branch runners a considerable distance apart. The main runner and its attendant branch runners must be of considerable length. In order to control the flow of slag to the branch runners, the main runner is provided with a cast iron or steel gate at each branch runner. There may be as many as six runners branching off the main runner necessitating at least five gates. The preparation and maintenance of the same or refractory-lined runners and gates are not only expensive but require a relatively large labor force thereby adding to the operating expense of the blast furnace.

It is the object of this invention to provide a novel method of controlling the continuous flow of molten slag from the blast furnace to slag receiving vessels whereby the use of multiple runners and gates on the cast house floor is unnecessary.

Broadly my invention includes interposing between the slag runner on the casting house floor of the blast furnace and the slag receiving vessel positioned directly beneath the discharge end thereof a pivotally tiltable means to intermittently interrupt the continuous flow of the said molten slag from the slag runner into the slag receiving vessels.

Figure 1:
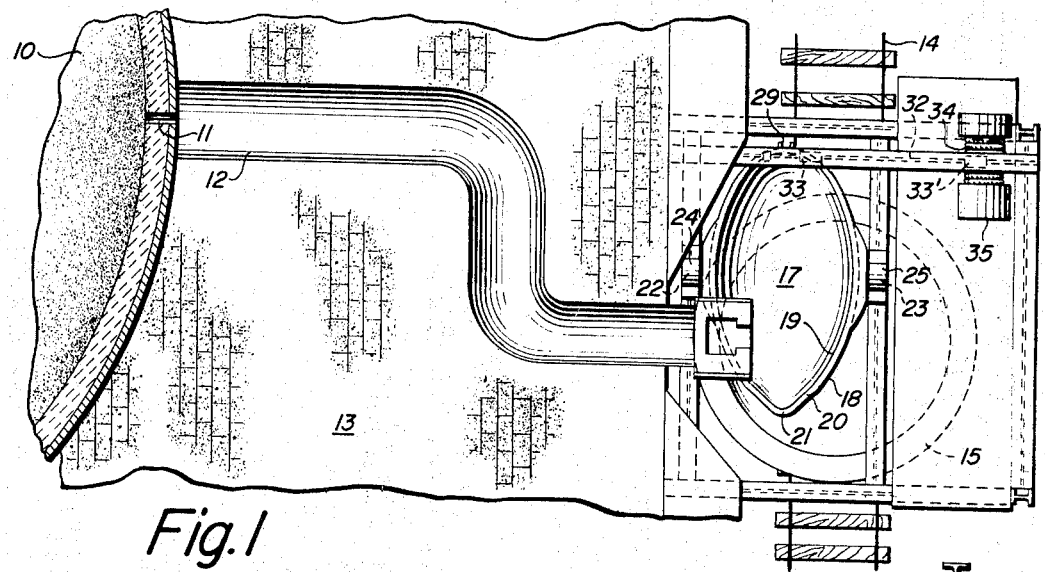
FIG. 1 is a plan view of the blast furnace casting floor showing the pivotally tiltable means interposed between the slag runner and the slag receiving vessels.

FIG. 1 shows in general a blast furnace and the apparatus and method used to remove molten slag therefrom. The blast furnace 10 is provided with a slag notch 11 through which molten slag is tapped and an iron notch (not shown) through which the molten iron is tapped. Directly below and communicating with the slag notch 11 is a slag runner 12 which extends outwardly from the furnace 10 to the edge of the cast house floor 13. A string of cars (not shown) each of which holds two empty inverted cone-shaped slag receiving vessels, is positioned parallel to and approximately twenty feet below the edge of the cast house floor 13 on the track 14. The cars are placed so that the first empty slag receiving vessel 15 is directly beneath the discharge end of the slag runner 12. Interposed between the first empty slag receiving vessel 15 and the discharge end of the slag runner 12 is a generally ellipsoidally-shaped pivotally tiltable vessel shown at 17. The vessel 17, hereinafter referred to as a slag cut-off pot, includes an outer shell 18 usually made of steel and an inner lining 19 of any suitable refractory material such as fireclay brick. The open upper surface 20 of the slag cut-off pot 17 is generally ellipsoidal in shape with the major axis of the ellipse being parallel to the edge of the cast house floor 13 and the minor axis being perpendicular thereto. The forward portion of the upper surface 20 is contoured to form a pouring spout 21. A pair of trunnions 22 and 23 projecting from diametrically opposite points of the shell 18 define the points around which the slag cut-off pot may be pivotally tilted. Trunnions 22 and 23 are mounted in support bearings 24 and 25 respectively.

Attached to the underside of the slag cut-off pot is a metallic chain guide channel 29. A pair of parallel brackets 27 (one of which is shown) and a pin 28 are fastened to the shell 18 at one end of the guide channel 29. One end of chain 30 is attached to the pin 28 while the opposite end is attached to a hook 31. The hook 31 in turn is supported by a wire rope 32 extending upwardly to a first pulley 33 which is attached to an overhead structural member, around the said first pulley to a second pulley 33', around the said second pulley 33' downwardly to a wire rope take-up reel 34 which is driven by motor 35.

Figure 3:
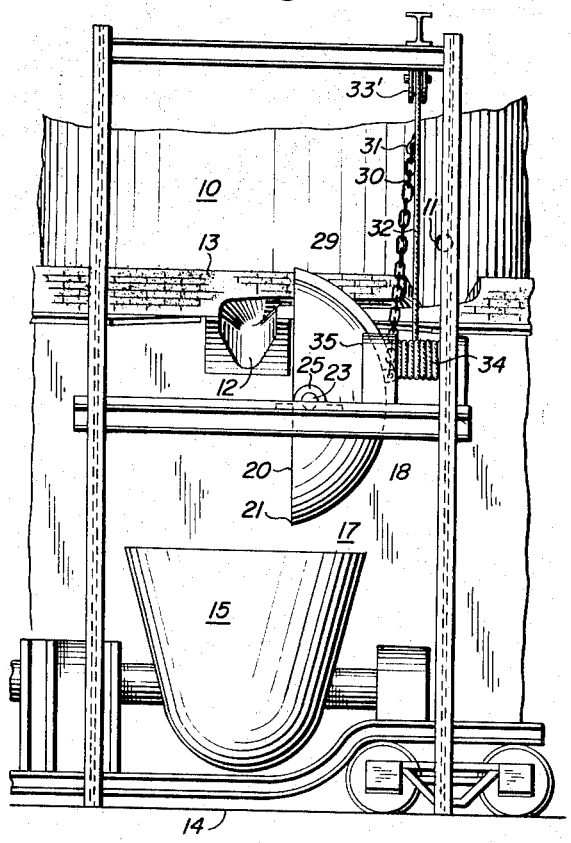
FIG. 3 is an elevation view showing the pivotally tiltable means in a vertical position.
Figure 2:
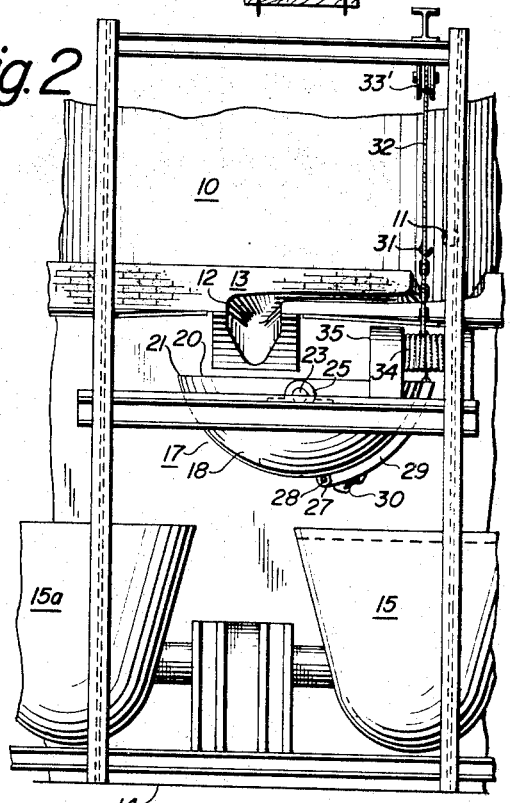
FIG. 2 is an elevation view showing the pivotally tiltable means in the horizontal position.

In normal practice, when it is desired to remove molten slag from the hearth in the blast furnace, the vessel 17 is in a downwardly tilted position, that is the forward end of the vessel is directed in a generally vertically downward direction so as to allow the molten slag to flow from the discharge end of the runner 12 directly into the first slag receiving vessel 15 placed directly beneath the said discharge end of the said runner as shown in FIG. 3. When the first slag receiving vessel 15 is filled, the motor 35 is activated and the slag cut-off pot 17 is allowed to pivotally rotate on the trunnions 22 and 23 to a horizontal position as shown in FIG. 2 thereby interrupting the flow of slag to the first slag receiving vessel 15. The slag cut-off pot 17 now becomes a receptacle to hold the molten slag. The string of cars carrying the slag receiving vessels is activated by a standard car haul system (not shown) thereby removing the first slag receiving vessel 15 which is filled with molten slag from directly beneath the discharge end of the slag runner 12 and positioning a second empty slag receiving vessel 15a beneath the discharge end of the slag runner 12. When the second slag receiving vessel 15a is in position, the tilting means is activated thereby causing the slag cut-off pot 17 to pivotally rotate on its trunnions 22 and 23. The forward end of the slag cut-off pot 17 is tilted vertically downward causing the molten slag contained therein to flow into the said second slag receiving vessel 15a and allowing the slag to flow from the discharge end of the runner 12 directly into the said second slag receiving vessel 15a. Intermittent interruption of the flow of slag from the discharge end of the runner 12 to the slag receiving vessels positioned directly thereunder as described above allows all the molten slag in the hearth of the blast furnace to be removed in a continuous manner.

Although I have described the preferred embodiment of the invention it will be understood that modifications in construction and arrangement and mode of operation of the apparatus may be made without departing from the scope of the invention.

I claim:
1. A method of controlling the continuous flow of molten slag from a blast furnace to slag receiving vessels comprising:
  (a) tapping molten slag from a furnace,
  (b) flowing said slag into a refractory-lined runner,
  (c) flowing said slag from said runner to a first slag receiving vessel positioned directly beneath the discharge end thereof,
  (d) positioning a pivotally tiltable vessel adjacent the discharge end of said slag runner,
  (e) tilting said pivotally tiltable vessel into a horizontal position in the path of flow of the slag to receive said slag from said slag runner when said first slag receiving vessel has received its load of slag,
  (f) removing said first slag receiving vessel and replacing said first slag receiving vessel with an empty second slag receiving vessel,
  (g) tilting said pivotally tiltable vessel out of the path of flow of the slag to allow the slag in the said pivotally tiltable vessel to flow into the said second slag receiving vessel and to allow the slag in the said slag runner to flow into the second slag receiving vessel.

References Cited
UNITED STATES PATENTS

| | | | |
|---|---|---|---|
| 863,469 | 8/1907 | Thill et al. | 222—166 |
| 1,590,730 | 6/1926 | Evans | 266—38 X |
| 2,549,790 | 4/1951 | Finkeldey et al. | 266—38 |
| 3,301,545 | 1/1967 | Hellmund | 266—38 |

LAVERNE D. GEIGER, *Primary Examiner.*

H. S. BELL, *Assistant Examiner.*